United States Patent
Masuda et al.

(10) Patent No.: US 6,226,651 B1
(45) Date of Patent: *May 1, 2001

(54) DATABASE DISASTER REMOTE SITE RECOVERY

(75) Inventors: Hiromi Masuda, Osaka (JP); Jack R. Shedden, Morgan Hill, CA (US); James Zu-Chia Teng, San Jose, CA (US); Shyh-Yee Wang, Cupertino, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,274

(22) Filed: Mar. 27, 1998

(51) Int. Cl.[7] ........................................ G06F 12/00
(52) U.S. Cl. .................... 707/202; 707/200; 707/201; 707/203; 707/204
(58) Field of Search ................... 707/200, 201, 707/202, 203, 204, 8

(56) References Cited

U.S. PATENT DOCUMENTS

| | | | |
|---|---|---|---|
| 4,507,751 | 3/1985 | Gawlick et al. | 707/202 |
| 4,686,620 | 8/1987 | Ng | 707/10 |
| 4,868,744 | 9/1989 | Reinsch et al. | 714/19 |
| 4,945,474 | 7/1990 | Elliott et al. | 714/16 |
| 5,170,480 | 12/1992 | Mohan et al. | 707/201 |
| 5,379,418 | 1/1995 | Shimazaki et al. | 714/11 |
| 5,381,545 | 1/1995 | Baker et al. | 714/19 |
| 5,392,432 | 2/1995 | Engelstad et al. | 707/103 |
| 5,404,508 | 4/1995 | Konrad et al. | 707/202 |
| 5,412,801 | 5/1995 | de Remer et al. | 714/20 |
| 5,497,487 * | 3/1996 | Fortier | 707/1 |
| 5,504,861 | 4/1996 | Crockett et al. | 714/13 |
| 5,524,239 * | 6/1996 | Fortier | 707/1 |
| 5,530,855 | 6/1996 | Satoh et al. | 707/201 |
| 5,546,573 | 8/1996 | Obermann et al. | 707/101 |
| 5,555,371 | 9/1996 | Duyanovich et al. | 714/13 |
| 5,592,618 | 1/1997 | Micka et al. | 714/54 |
| 5,594,900 | 1/1997 | Cohn et al. | 707/202 |
| 5,596,706 | 1/1997 | Shimazaki et al. | 714/6 |

(List continued on next page.)

OTHER PUBLICATIONS

H. Ambach et al., "BD2 and System 390 a Perfect Fit", 10 pps., undated.

IEEE publication, "Overview of Disaster Recovery for Transaction Processing System" by Richard King et al., IBM T.J. Watson Research Center, Yorktown Heights, pp. 286–293 Jun. 1990.*

IEEE publication, "Design Approaches for Real–Time Transaction Processing Remote Site Recovery" by D. I. Burkes, IBM Almaden Research Institute, pp. 568–572 Mar. 1990.*

Primary Examiner—Thomas Black
Assistant Examiner—Diane D. Mizrahi
(74) Attorney, Agent, or Firm—Sawyer Law Group LLP; Ingrid Foerster

(57) ABSTRACT

An integrated DBMS solution to recover primary site database based upon the maintenance of a shadow copy of the primary site's database data and logs at a remote site. Both the primary site DBMS and the remote site DBMS may support write-ahead logging protocol in which log records are written to a log data set before database updates are entered into the remote site storage. The remote site serves at least two functions: as a "tracker" DBMS and as a "take-over" DBMS. The tracker function maintains a shadow copy of the primary site's database data sets at the remote site. The multi-phased take-over function uses the shadow copies to update the remote site database data sets and substitutes them for primary site database data sets made unavailable by an unplanned disaster at the primary site.

35 Claims, 6 Drawing Sheets

U.S. PATENT DOCUMENTS

| | | | | |
|---|---|---|---|---|
| 5,613,106 | * | 3/1997 | Thurman | 707/200 |
| 5,640,561 | | 6/1997 | Satoh et al. | 707/202 |
| 5,644,698 | | 7/1997 | Cannon | 714/6 |
| 5,673,382 | | 9/1997 | Cannon et al. | 714/6 |
| 5,721,918 | * | 2/1998 | Nilsson | 707/202 |
| 5,832,508 | * | 11/1998 | Sherman | 707/200 |
| 5,903,898 | * | 5/1999 | Cohen | 707/204 |
| 5,907,848 | * | 5/1999 | Zaiken | 707/202 |
| 5,926,816 | * | 7/1999 | Bauer | 707/8 |

* cited by examiner

DATABASE DISASTER REMOTE SITE RECOVERY

BACKGROUND OF THE INVENTION

1. Field of the Invention

The present invention relates generally to disaster recovery in data processing systems. More particularly, the present invention relates to maintaining and employing shadow copies of a database for remote site disaster recovery.

2. Description of the Related Art

Data processing systems typically require a large amount of data storage. Customer data, or data generated by users within the data processing system, usually occupy a great portion of this data storage. Effective data processing systems also provide back-up copies of this user data to insure against a loss of such data. For most businesses, any loss of data in their data processing systems is catastrophic, severely impacting the success of the business. To further protect customer data, some data processing systems extend the practice of making back-up recovery copies to provide disaster recovery. In disaster recovery systems, a recovery copy of the customer data is kept at a site remote from the primary storage location. If a disaster strikes the primary storage location, the customer data can be retrieved or "recovered" from the recovery copies located at the remote site.

Several methods are known for providing disaster protection using mirror copies of the primary storage data at a remote storage site. Remote dual copy, or remote data duplexing, is one form of this data mirroring solution. In remote dual copy, additional storage devices are provided in the data processing system such that an additional copy of the primary data is written to a recovery storage device. Storage devices are coupled together to form duplex pairs, each duplex pair consisting of a primary and recovery storage device. The primary storage device is located at the primary storage location, while the recovery storage device is located at the remote site. When data is written to the primary storage device, the data processing system automatically copies the data to the recovery site.

Full volume copying is an alternate method for providing disaster recovery of a database. Full volume copying may use a storage management server to generate recovery storage volumes from the primary storage volumes. Commonly, a client-server configuration includes several clients connected to a single server. The clients create client files and transfer these files to the server. The server receives the client files and stores them on several attached storage devices. When used as a storage management system, the server manages the back-up, archival, and migration of these client files. By storing the client file on an attached storage device, the server creates a first back-up, or primary, copy of the client file. The server may, in turn, create additional back-up copies of the client file to improve the data availability and data recovery functions of the storage management system. Clients may vary from small personal computer systems to large data processing systems having a host processor connected to several data storage devices. The server can also range from a small personal computer to a large host processor.

To provide disaster recovery, the storage management server must generate a recovery copy of the client file and oversee the transmission of this recovery copy to a remote site. As a disaster recovery system, the server partitions the storage subsystem into a set of primary storage volumes and a set of remote, or off-site, recovery storage volumes. The off-site recovery volumes may contain removable media, so that they can be transported to the remote site. These volumes may be formatted using the same format or a different format from that used by the primary storage volumes for storing data and commands.

The server determines which client files need to be backed-up within the storage subsystem, how frequently these back-up copies should be made, or which set of the volumes should be transported to the remote site. The server or a separate controller may manage the off-site recovery storage volumes and determine which volumes are needed for disaster recovery. Off-site storage volumes no longer needed for disaster recovery may be reclaimed and reused. The server typically coordinates the reclamation and reuse of the recovery storage volumes. Successful reclamation and reuse of recovery volumes no longer needed for disaster recovery substantially improves the efficiency and performance of a disaster recovery system.

Incremental back-up techniques have evolved to improve the efficiency of disaster recovery systems. Using these techniques, only the user files new to the primary storage volume are copied to the recovery volumes since the last periodic back-up operation was completed. Thus, incremental back-up eliminates the unnecessary copying of files that remain unchanged since the previous back-up operation. As compared to full volume copying, incremental back-up reduces the number of partially filled storage volumes at the remote site. It also reduces the amount of duplicate files and duplicate volumes stored at the remote site, thereby simplifying the management of off-site recovery storage volumes.

Problems still exist in the management of the off-site storage volumes even when incremental back-up techniques are used. As outdated primary copies of client files are expired from the server, the corresponding recovery copies are no longer needed at the remote site. In turn, the amount of relevant space—space occupied by recovery copies needed for disaster recovery—decreases on the off-site storage volumes. When the reclamation threshold is reached on a particular off-site storage volume, the server reclaims the recovery volume by copying the remaining files to an alternate storage volume. However, the server may not be able to mount the volume to be reclaimed since it is located off-site. Moreover, the server may not be able to return the file to the primary storage site for mounting since a disaster may have destroyed the primary site. Further, disaster protection may be lost if the off-site volume is moved to the primary storage site before the volume has been reclaimed and then a disaster destroys the primary site.

What is needed is a tracker database management system (DBMS) used to maintain shadow copies of primary database data at a remote recovery site. The tracker DBMS system should allow fast remote site takeover when a disaster occurs at the primary database site. Further, updates to the remote site shadow copies should be synchronized by use of a restart procedure at the remote site. The restart procedure should apply updates using a multi-phase restart procedure at the remote site when the primary site fails.

SUMMARY OF THE INVENTION

Broadly, the present invention provides an integrated DBMS solution to recover a primary site database based upon maintenance of a shadow copy of the primary site's database at a remote site. Both the primary site DBMS and the remote site DBMS support write-ahead logging protocol in which log records are written to a log data set before database updates are entered into external storage.

In one embodiment of the invention, the remote site serves at least two functions: as a "tracker" DBMS and as a "take-over" DBMS. The tracker function maintains a shadow copy of the primary site's database at the remote site. The take-over function uses the shadow copies to update the remote site databases and substitutes them for the primary site's databases that were made unavailable by a disaster.

The remote site is initialized as a mirror image of the primary site by transmitting all database data and recovery logs from the primary site to the remote site. After initialization, the primary site periodically starts and stops the remote site as a tracker system to keep the shadow copy up-to-date using database recovery logs and data shipped from the primary site. When started as a "tracker," the remote DBMS logs are initialized, system data is rebuilt, and transaction status is determined.

Whenever the tracker system is restarted, an end log point is specified that is used as the log scan ending point for all data recovery done during the current recovery cycle. This end log point is recorded in the shadow database after each data recovery and is used as the log scan starting point for the next recovery cycle when the tracker function is restarted with a new set of logs received from the primary site. In order to maintain the shadow database, if a LOG (NO) is encountered—if an image copy of a database data set is either reorganized or LOAD-replaced—the primary site must transmit a new image copy of the database data set from the time of the last tracker restart.

When a disaster occurs at the primary site, the remote site becomes the takeover site. When restarting the remote DBMS as a take-over system, the primary site's logs are used to implement a normal three-phase system restart. The logs from the last system checkpoint are scanned to determine the transaction status at the time of the system failure, and to determine the earliest point in the log that the recovery function will need to process for a forward log recovery phase. The remote DBMS log initialization and transaction status is also determined and Forward Log Recovery (FLR) and Backward Log Recovery (BLR) phases are executed.

In the FLR phase, locks are acquired for in-doubt transactions. In-doubt transactions can be either committed or rolled back according to a decision made by a transaction coordinator supporting two-phase commit protocol. During BLR, log entries are backed out for log data that was not committed at the time the system failed.

The above noted processing permits the remote DBMS to take-over, that is, to perform data recovery, bringing the shadow data up-to-date before the remote DBMS begins to perform the same functions as the now-failed primary DBMS.

The invention affords its users with a number of distinct advantages. One advantage is that the invention provides a tracker DBMS that maintains shadow copies of primary database data at a remote recovery site. Another advantage is that the tracker DBMS system allows fast remote site take-over when a disaster occurs at the primary database site. Further, updates to the remote site shadow copies are synchronized using a multi-phased restart procedure at the remote site for applying updates when the primary site fails.

The invention also provides a number of other advantages and benefits, which should be apparent from the following description of the invention.

BRIEF DESCRIPTION OF THE DRAWING

The nature, objects, and advantages of the invention will become more apparent to those skilled in the art after considering the following detailed description in connection with the accompanying drawings, in which like reference numerals designate like parts throughout, wherein.

DESCRIPTION OF THE PREFERRED EMBODIMENTS

Hardware Components & Interconnections

Figure 1:
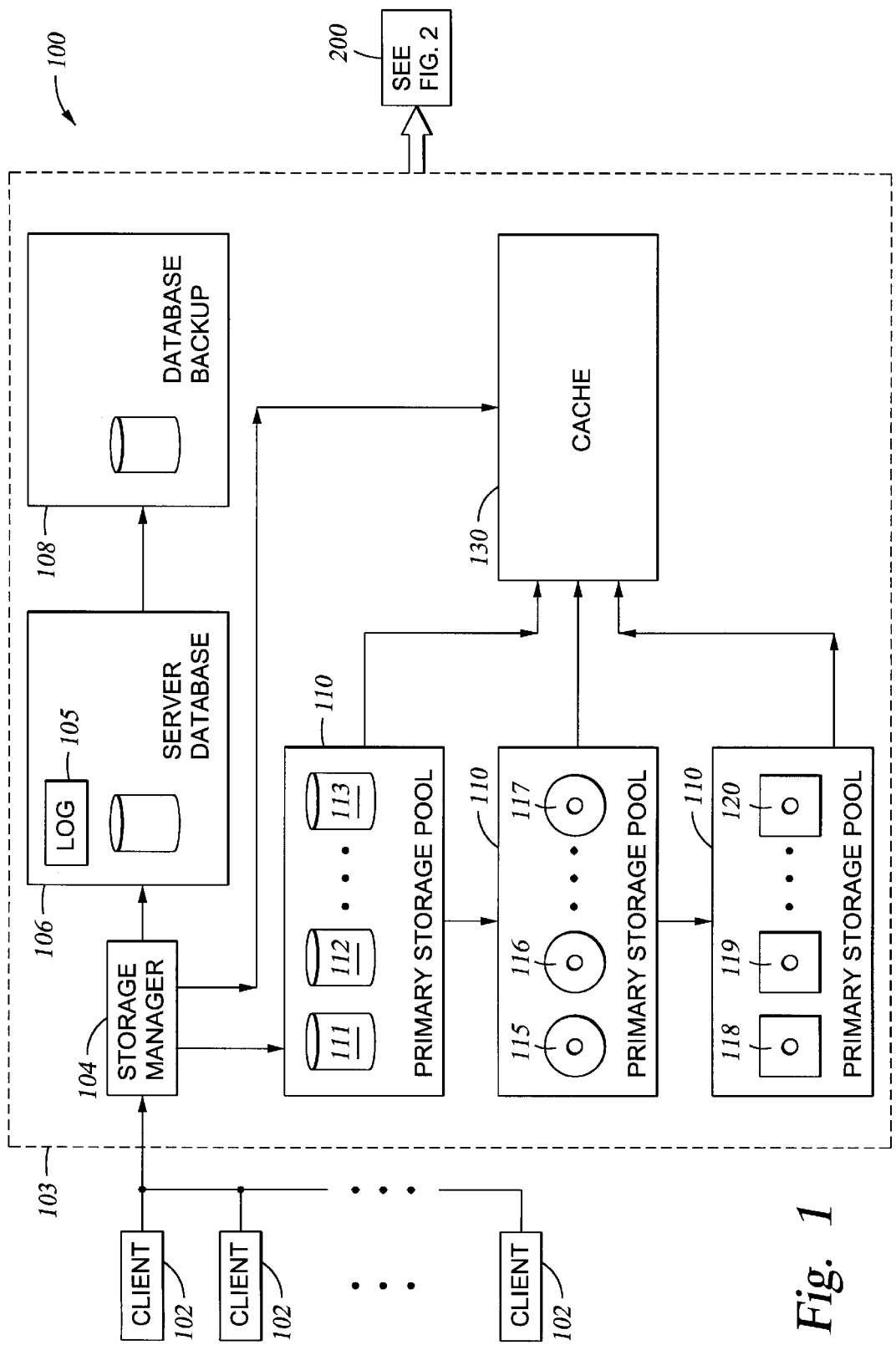
FIG. 1 is a block diagram of a digital data processing machine for a primary site in accordance with one embodiment of the invention.

One aspect of the invention concerns an integrated DBMS solution to recover a primary site database based upon maintaining a shadow copy of the primary site's database data at a remote site, and that may be embodied by various hardware components and interconnections, one of which is described in FIG. 1.

However, in discussing a particular embodiment of the invention, singular or plural reference to elements or features of that embodiment is not meant as a limitation of any other embodiment unless specifically stated.

One aspect of the invention concerns an apparatus 100 for remote site recovery of a primary site database using disaster recovery methods which may be embodied by various hardware components and interconnections as described in FIG. 1.

The apparatus 100 employs multiple client systems 102 coupled to a primary site 103. The primary site 103 includes a storage manager 104 coupled to a server database 106. The database may comprise multiple databases using similar or dissimilar formatting. The storage manager 104 is further coupled to a plurality of primary storage pools 110 and a cache 130. A storage pool 1110 consists of a plurality of storage devices, either a direct access storage device (DASD), optical disk, or magnetic tape devices. All storage devices within the primary storage pool 110 may be, but are not necessarily, identical in type and format. The server database is further coupled to a set of recovery volumes 220 shown in FIG. 2 and providing a back-up for the server database 106. In one embodiment, the recovery volumes 220 are located at a site remote from the primary storage site.

Each client system 102 creates original user data files, or client files, which are stored within the corresponding client system if the client system is provided with a storage system. Regardless, the client systems 102 transfer client files to the primary site 103. Transferring client files to the primary site 103 inherently provides a backup mechanism within the server for original client files stored within the client system. The storage manager 104 directs the client file to a storage device, or storage volume, within a primary storage pool 110. The primary storage pool stores a primary copy of the client files. The storage manager 104 maintains a log 105 within the server database 106 listing the files stored within the primary storage pool 110 and the cache 130 of the primary site 103. Once the client file is stored within a primary storage pool 110, the storage manager 104 updates the server database 106 and logs the updates in log 105 at the primary site 103.

In one embodiment, the primary site 103 might also include the cache 130. This cache is used by the storage manager 104 to coordinate temporary storage of data copied from nonvolatile storage during a restart recovery process. In one embodiment, the cache 130 is volatile storage. In another embodiment, the cache is 5 nonvolatile but erasable. Regardless, if the cache 130 becomes full during a restart recovery process, over-flow data may be written to another cache, for example, cache (not shown) located in the storage manager 104.

Figure 2:
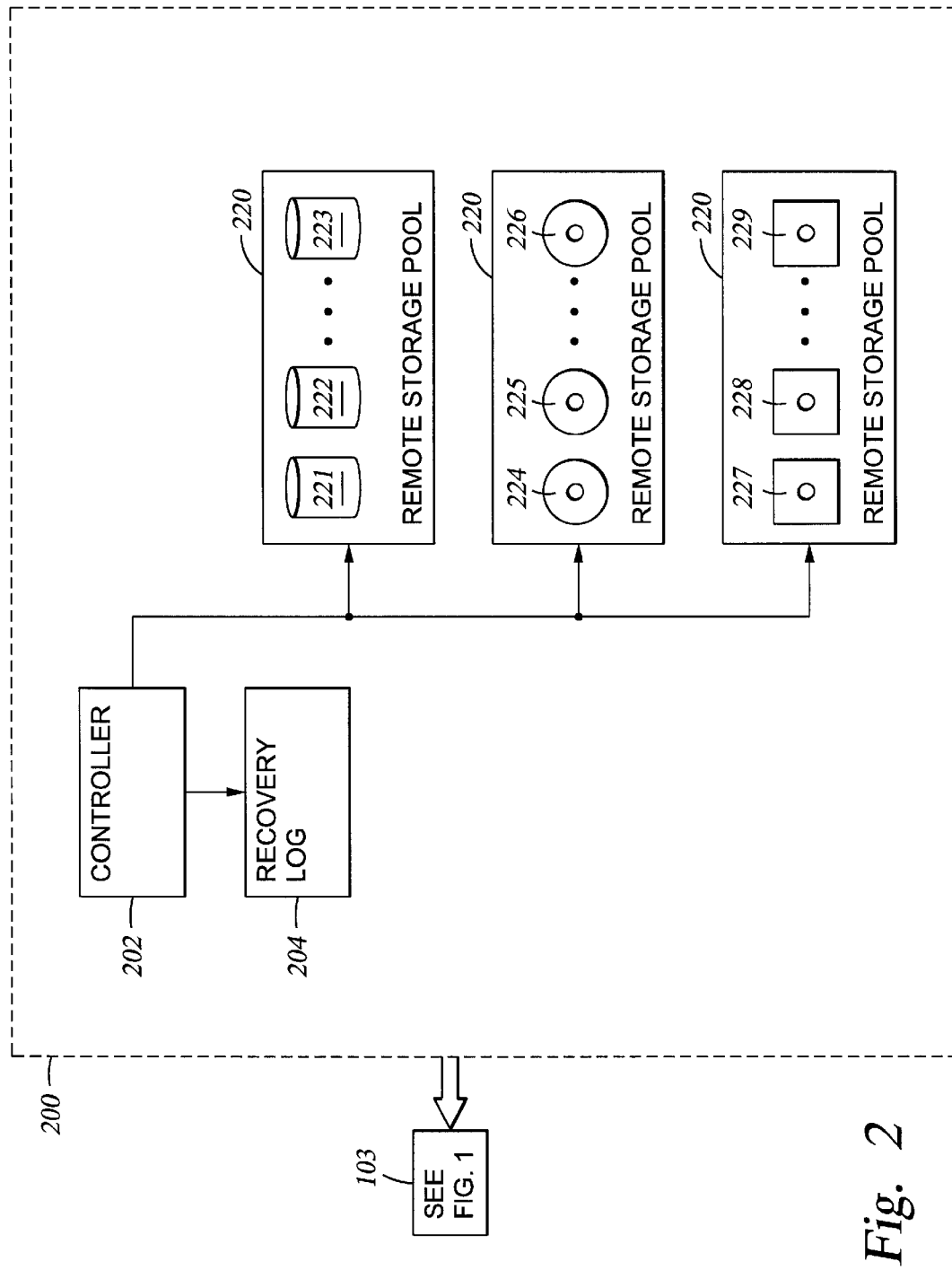
FIG. 2 is a block diagram of a digital data processing machine for a remote site in accordance with one embodiment of the invention.

In one embodiment, the primary site 103 might also generate an additional back-up recovery copy of the client file and store this recovery copy on a storage device, or storage volume, within a remote site 200 shown in FIG. 2. The storage manager 104 coordinates this operation. Once the additional recovery copy is created, the storage manager 104 updates the log 105 of server database 106 to catalog the recovery copy of the client file. In addition, the log entry within the server database corresponding to the recovery copy includes cross-reference to the primary copy of the client file. Thus, the primary copy in the primary storage pool 110 is linked to the recovery copy.

FIG. 2 shows a remote site 200 of FIG. 1 configured as a remote disaster recovery system. The disaster recovery system includes a remote storage pool 220 within the remote site 200. The remote site server 200 also includes the controller 202 and a recovery log 204. In addition, the remote storage pool 220 may contain copies of the data volumes contained in the primary storage volumes located within the primary storage pools 110 and any other resident copy storage volumes within the primary storage site 103. The remote site 200 contains remote storage pool 220 which are copy storage volumes that have been transferred from the primary storage site 103 at the direction of the storage manager 104.

The storage manager 104 determines which primary storage pool volumes 111–120 should be used for back-up storage and recovery, and then copies and marks the designated volume in the primary site 103 database as an off-site storage volume. The copies are then delivered to the remote site 200. The storage manager 104 uses the server database 106 to monitor the recovery copies of the client files stored on the offsite storage volumes 221–229. The storage manager 104 can then determine when an off-site volume is no longer needed for disaster recovery, and marks this volume for deletion or transfer back to the primary storage site 103. Further, as each data base transaction is executed and each database recovery copy is made, an entry is made by the storage manager 104 in the log 105 to keep track of each transaction and data update. In another embodiment, back-up volumes to the primary storage pool 110 may be kept at the primary site 103 in addition to the remote storage pool 220 backup copies housed at the remote site 200.

Regardless of whether primary storage pool volume 111 through 120 is marked and copied as an off-site volume and then physically transported to the remote site, or whether the contents of the copy of the primary storage pool volumes is transmitted to the remote site via a data link, the remote site 200 shown in FIG. 2 processes the data in a similar manner. As discussed in detail below, when updated data is received by the controller 202 of the remote system 200, the controller decides which of the off-site storage volumes 220 and respective recovery logs will receive the updated data. If an existing file on a remote site volume 221 through 229 is to be updated, the controller 202 routes the updated data to the respective volume and log. If no current file exists that needs to be updated, the controller 202 may allocate the file to any of the storage volumes 220. As the updated data is received, the controller 202 also updates a recovery log 204. The log 204 acts as index for the data records being maintained on the remote storage pool 220 volumes. The recovery log 204 may also perform other functions as discussed below. The transfer of data from the primary storage site 103 to the remote site 200 is coordinated by the storage manager 104 and the controller 202.

Despite the specific foregoing description, ordinarily skilled artisans having the benefit of this disclosure will recognize that the apparatus discussed above may be implemented in a machine of different construction, without departing from the scope of the invention.

Operation

In addition to the various hardware embodiments described above, a different aspect of the invention concerns a method for recovering databases using the present invention.

Transaction Execution

The apparatus shown in FIGS. 1 and 2 is used in one embodiment to maintain and back up a primary site database. The server database 106 may contain multiple databases where the databases do not share a similar logical structure or format. Regardless, each of the databases is intended to contain data which reflects a real state of the information that database is supposed to capture. When the databases reflect what is the current state of the data, the databases are deemed consistent.

To better understand the recovery system of the present invention, the following terminology should be helpful. A database transaction (transaction) is a program unit whose execution preserves the consistency of the database. For example, if before a transaction executes the database is in a consistent state then, when the next transaction completes its execution, the database remains in a consistent state. The transaction assesses and possibly updates various data items contained in the database. Each of the data items may be read by the transaction and is written by the transaction if it updates that data item. A transaction is the work that occurs between the beginning of a unit of work and a commit or rollback as defined below.

Figure 3:
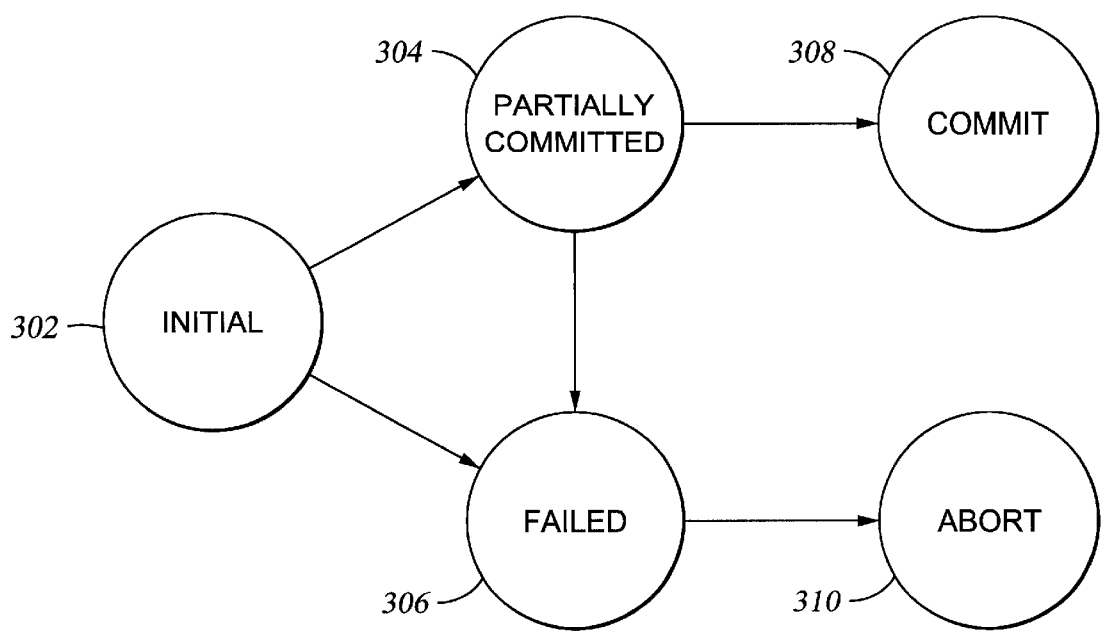
FIG. 3 is a logic diagram showing committed versus aborted transactions.

As reflected in FIG. 3, a transaction block diagram is shown. The transaction is shown in its initial state in task 302. When it reaches its last statement, it enters a partially committed state in task 304. At this point, the transaction has completed its execution, but it is still possible that it may have to be aborted since the actual updates may not have been output to storage yet, and thus a hardware failure may preclude its successful completion. This type of update is considered "in-doubt". In one embodiment of the present invention, writes to storage take place after a transaction has entered the commit stage as shown in task 308. In another embodiment, writes to storage only occurs as decided by the controller 202. As discussed below, one way to implement such a scheme is to temporarily move any data associated with such writes to nonvolatile storage, and to perform the actual writes only at commit time 308. A committed transaction will then be able to complete its write except in the case of hardware storage failures.

The transaction enters the failed state in task 306 if it is determined that the transaction cannot proceed with normal execution, that is, for example, due to hardware or logical errors. If failure occurs, the transaction must be rolled-back. Once a rollback has occurred, the transaction enters the aborted state in task 310.

Figure 4:
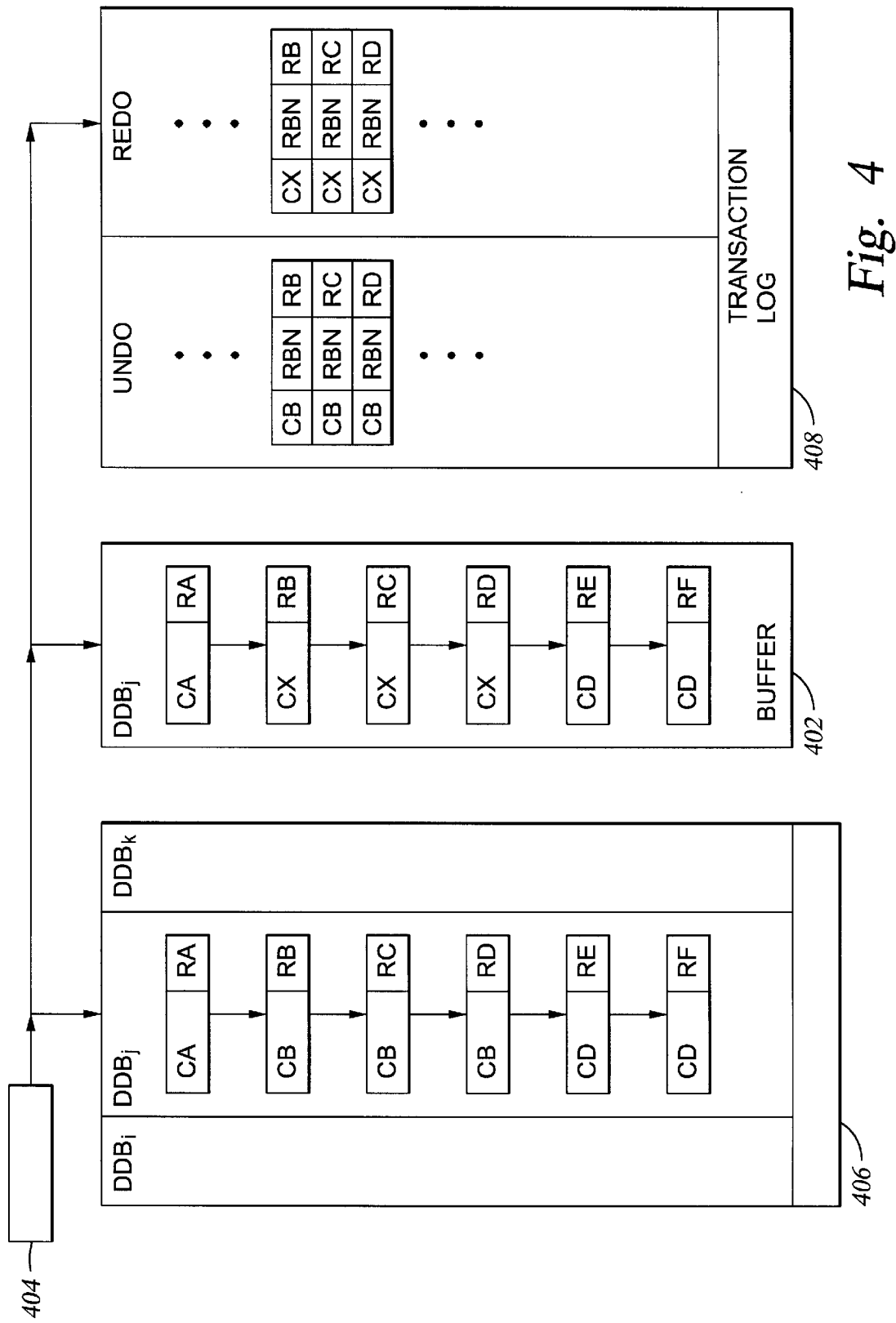
FIG. 4 is a block diagram used to exemplify data changed by transactions in accordance with one embodiment of the invention.

As applied to this invention and as illustrated in FIG. 4, "forward" database updating is performed by using REDO records of a transaction log 408. As an example, assume that records, identified by record numbers RA–RF are included in the defined data block j (DDBj) which is included in a data set stored in a database 406. Assume next a transaction against records RB–RD of DDBj, and that the records are to be updated as a result of the transaction. For updating, a storage manager 404 transfers the page DDBj to a buffer 402 where the records RB–RD are updated, in each case by changing record data CB to CX. During the processing of these records, log entries are made in the sequence in which the records were updated. Each record update results in the writing of an UNDO and REDO record to the transaction log 408. For example, the transaction log entry for updating record RB includes an UNDO record with a field containing the record data before updating (CB), a field identifying the record (RB), and a field containing a relative block number (RBN) which identifies the location of the primary storage page containing the record and the sequence in which it was entered into the log. This sequence identifier may be a time stamp or other sequential marker, and it may be contained in a field separate from the RBN. The REDO component of the log record includes a field containing the update of the record data (CX) and the RBN and RB fields identifying, respectively, the page and the record. Assuming completion of the transaction or set of transactions which update records RB–RD, the storage manager 404 will copy the page DDBj to the buffer 402. The storage manager 404 will then write the buffer page to the primary storage location for DDBj. Later, if recovery is required, the recovery process will use a version of the transaction log REDO records to update records RB–RD.

Forward and "backward" updating recovery functions are available in database products manufactured by the IBM Corporation. Forward and backward updating are supported in the database manager of the IBM DB2 and IMS/ESA program products. In these products, UNDO records are logged in addition to REDO records. If a transaction associated with a REDO record ABORTs, the record data from the UNDO record is logged as a REDO record and is applied to the database, thus "backing-out" the original update to the record. Successful completion of the transaction is indicated by a COMMIT operation which is recorded by a COMMIT record in the transaction log. If the transaction is abnormally terminated, an ABORT record is entered in the log.

After the server database 106 and the storage pools 110 of primary site 103 have been updated by a transaction, the off-site recovery storage volumes of remote site 200 may be updated, as described below with respect to the method of the invention.

Overall Sequence of Operation

Figure 5A:
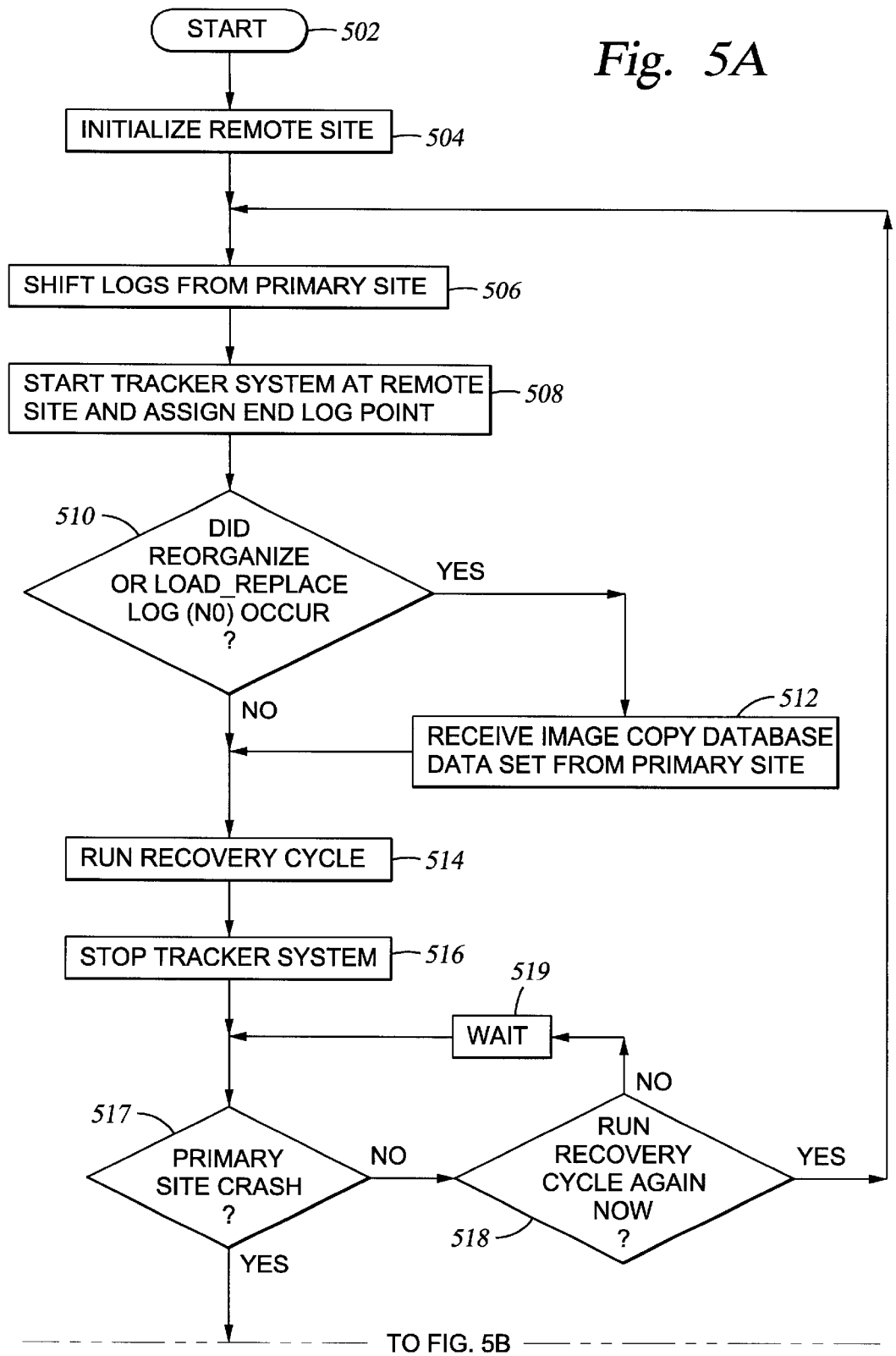
FIGS. 5A and 5B is a flowchart of an operational sequence for remote site recovery of a primary site database in accordance with one embodiment of the invention.
Figure 5B:
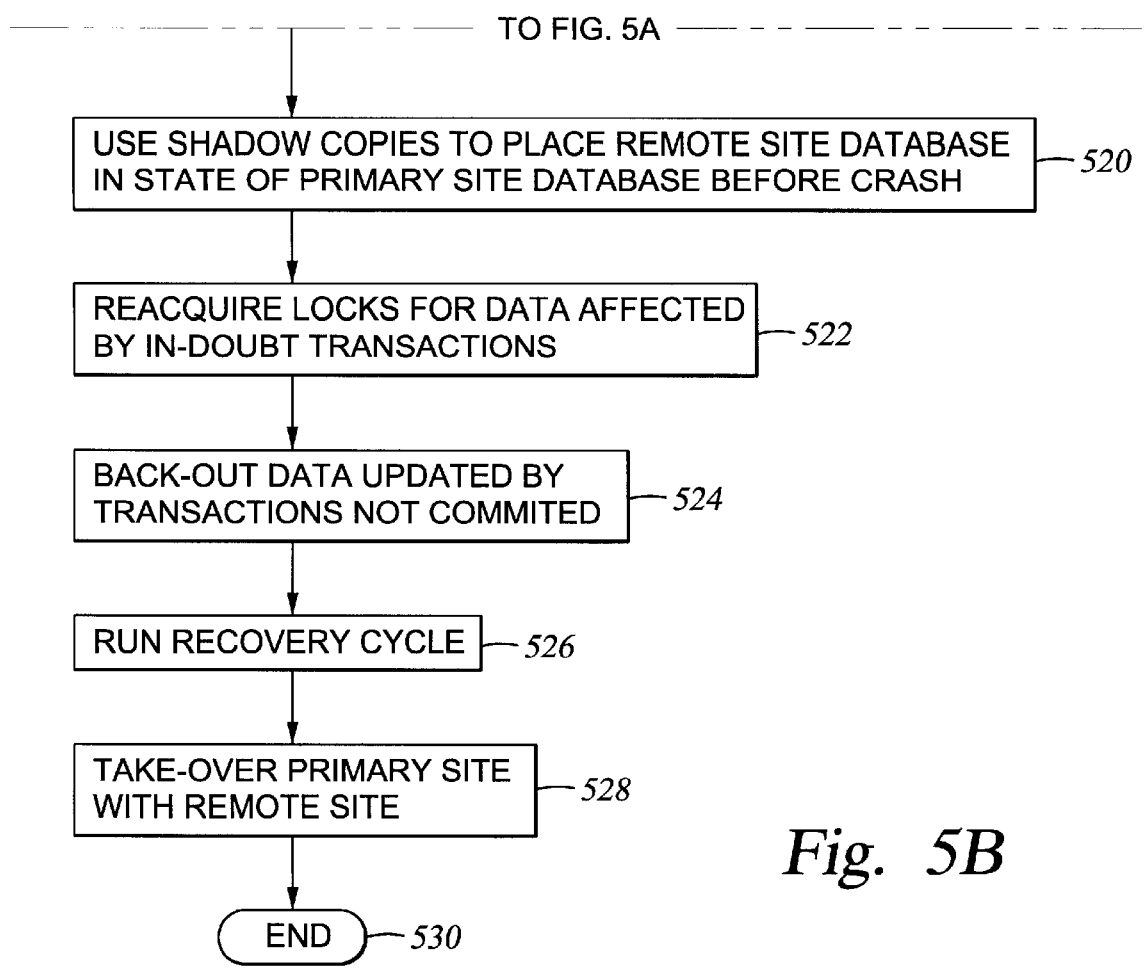

FIGS. 5A and 5B show a sequence of method steps 500 to illustrate one example of the method aspect of the present invention. For ease of explanation, but without any limitation intended thereby, the example of FIGS. 5A and 5B are described in the context of the apparatus 100 described above. However, the method may be practiced in other system environments, such as a DB2 relational database management system for the S/390 platform (trademark of the assignee of the current invention).

The invention introduces in task 502 a "tracker" DBMS at the remote site. The purpose of starting the tracker DBMS is to maintain shadow copies of primary site data at the remote site. This allows fast remote site take-over if a disaster or "crash" occurs at or eliminates the primary site. In one embodiment, the tracker DBMS system at the remote site supports write ahead logging (WAL) protocol, that is, the need to externalize logs to the log data set before database updates can be written to non-volatile storage.

Initially, the remote site is initialized or "set-up" in task 504 as a mirror image of the primary site. In one embodiment, this is done by shifting all database data recovery logs from the primary site to the remote site. As discussed earlier in relation to the apparatus of one embodiment of the invention, the shifting in task 506 may physically transporting the database data and recovery logs from the primary site to the remote site, or transmitting the information from one site to the other. If the primary site database data or recovery logs are reorganized, or LOAD-replaced in task 510, then the affected log data and image copy database data set must be transported to the remote site in task 512. Any time after initialization has occurred in task 504, task 510 is executed if such reorganization or LOAD-replace occurs. Load-replace refers to replacing data within a log with other data or no data.

After the remote site is initialized, it may be periodically started and stopped as a tracker system to keep shadow copies of data up-to-date using the database logs received at the remote site from the primary site. The tracker system is started at the remote site in task 514. In task 514, the tracker system scans the logs from the last system check point to determine the transaction status and the earliest point in the remote site logs that the DBMS will need to process for recovery. Using the transaction status and this earliest point in the log, a data recovery cycle is performed. The recovery cycle updates the shadow copy of the primary site database and/or logs including all committed transactions which have occurred since the last time a recovery cycle has been run. In one embodiment, at each start of the tracker system in task 508 an end log point is assigned to the position in the remote site logs marking the end point of the data that has been updated in the remote site databases. In another embodiment, the end log point is assigned at the end of a recovery cycle shown in task 514. In either case, this end log point may be used as the log scan ending point for future data recovery done by this recovery cycle. The log end point may also be recorded in the shadow database data sets in one embodiment. As noted, it is used as the log scan starting point with the next recovery cycle when the tracker system is restarted with a new set of logs received from the primary site. The tracker system may be stopped in task 516 at the completion of the recovery cycle of task 514.

If a primary site disaster does not occur, the tracker system of the remote site may be run continuously, periodically, or at the occurrence of a designated event in task 518 and 519. In order to maintain shadow copy data integrity using the logs received from the primary site, the tracker system insures that the shadow copy data can only be updated via the data shadowing process of tasks 504 thru 519. Otherwise, shadow copy data may fall out-of-synchronization with log records processed and stored at the primary site. If the tracker system at the remote site is to be run again in task 518, then the tracker system returns to task 506.

If a disaster occurs at the primary site in task 517, the remote site becomes the take-over site. However, if the tracker system of the remote site is active at the time the disaster is occurring at the primary site, the tracker system must be stopped before it can be restarted at the take-over system. When restarting the remote system as the take-over system, the remote site tracker system is prevented from updating the shadow data during restart. This prevents the shadow data from being rendered inconsistent. However, in one embodiment, the take-over process uses the primary system's past-stored logs at the remote site to determine transaction status.

Restart proceeds by using shadow copies in task 520 to place the remote site database in the state of the primary site database immediately before the disaster occurred. Initially, the take-over system at the remote site scans the remote site logs from the last system check point to determine the transaction status at the time the primary site failed. The take-over system also determines the earliest point in the logs that the DBMS will need to process for a FLR phase of recovery. This earliest point in the log generally precedes the time of the disaster unless a system check point had completed at the time of the disaster but before a subsequent transaction was committed.

FLR uses data in the logs at the remote site to re-establish the remote site database to the state of the primary site database before the disaster. FLR also reacquires database locks for in-doubt transactions in task 522. Once an in-doubt transaction has been locked, the transaction may be backed committed or rolled back. The decision to commit an in-doubt transaction or rollback the transaction is made by a transaction coordinator, such as the controller 202 shown in FIG. 2, as long as the transaction coordinator supports two phase commit protocol. After FLR has completed in one embodiment, or parallel to the execution of FLR, backward log recovery (BLR) may be executed. In another embodiment, BLR uses the logs at the remote site in task 524 to back-out database updates for transactions not committed at the time the primary site abnormally terminated. During the FLR phase, the takeover system reacquires locks on behalf of each in-doubt transaction to protect uncommitted changes to the data. After the take-over system is restored, the take-over system runs a recovery cycle in task 526 to bring the shadow log and database data up-to-date. Thereafter, the remote site takes over in task 528 for the unavailable primary site and begins performing the same functions as would the primary site. The methods ends in take 530.

Signal-Bearing Media

Such a method may be implemented, for example, by operating the apparatus 100 to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to synchronize recovery logs transmitted to remote site to recover related databases having dissimilar logical structures or formats.

Figure 6:
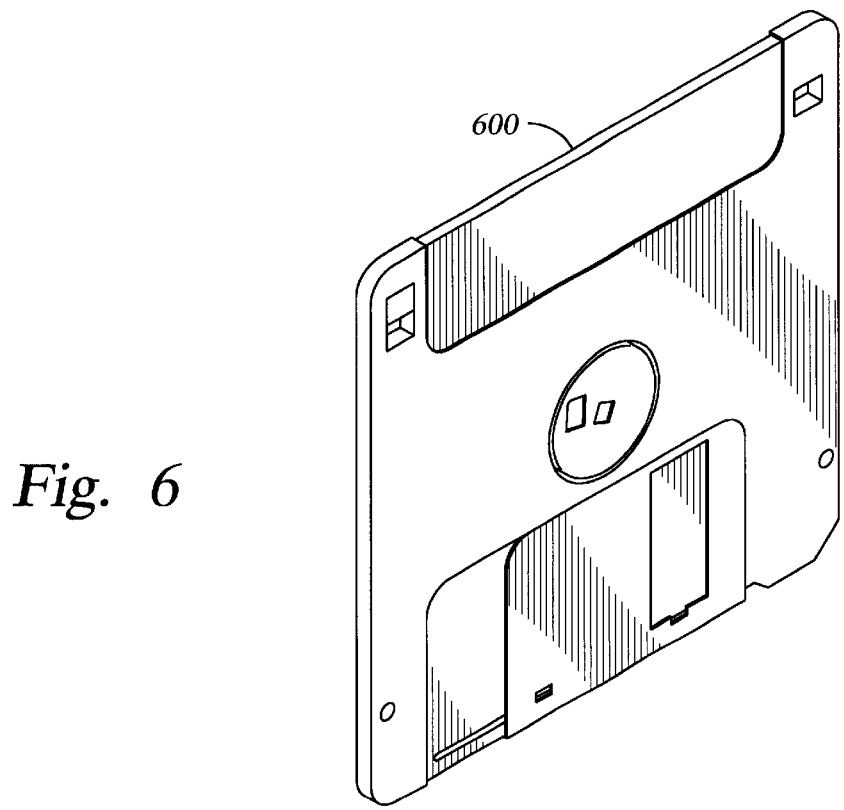
FIG. 6 is a perspective view of an exemplary signal-bearing medium in accordance with the invention.

This signal-bearing media may comprise, for example, RAM (not shown) contained within the apparatus 100. Alternatively, the instructions may be contained in another signal-bearing media, such as a magnetic data storage diskette 600 as shown in FIG. 6, directly or indirectly accessible by the apparatus 100. Whether contained in the apparatus 100 or elsewhere, the instructions may be stored on a variety of machine-readable data storage media, such as DASD storage (e.g., a conventional "hard drive" or a RAID array), magnetic tape, electronic read-only memory (e.g., ROM, CD-ROM, EPROM, or EEPROM), an optical storage device (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise lines of compiled C, C++, or similar language code commonly used by those skilled in the programming for this type of application arts.

Other Embodiments

While there have been shown what are presently considered to be preferred embodiments of the invention, it will be apparent to those skilled in the art that various changes and modifications can be made herein without departing from the scope of the invention as defined by the appended claims.

We claim:

1. A method to maintain a shadow copy of a primary site's database data at a remote location, the method comprising the steps of:

initializing a remote site having a mirror image of the primary site's database data;

periodically starting and stopping a tracker database management system (DBMS) at the remote site, the DBMS performing a recovery cycle to maintain the shadow copy of the primary site's database data at the remote site; and assigning an end log point to a log at the end of each recovery cycle, the end log point marking the end of log scan point for all data recovery done during the current recovery cycle, the end log point used as a starting point for a next recovery cycle.

2. The method recited in claim 1, the initializing step further comprising:

establishing a mirror image of the primary site's database data at the remote site by transmitting all primary site database data and recovery logs from the primary site to the remote site; and scanning the recovery logs from the last system checkpoint to determine transaction status and an earliest point in the recovery logs from which recovery will be executed.

3. The method recited in claim 2, the steps further comprising transmitting the primary site's log data and an image copy of a database data set to the remote site if either the log data or a database data set is reorganized or replaced at the primary site.

4. A method for taking-over a primary site with a remote site, the method comprising the steps of:

initializing and rebuilding the remote site, the remote site including a shadow copy of the primary site's database data and logs, the logs reflecting an end log point, the end log point marking an end of log scan point for all data recovery done during prior recovery cycles;

using the shadow copy logs to place the shadow copy database to a state of the primary site's database before the primary site became unavailable;

acquiring locks for database data affected by in-doubt transactions;

backing-out data updated by transactions not committed at a time the primary site became unavailable; and taking-over the primary site with the remote site.

5. The method recited in claim 4, initializing and rebuilding the remote site further comprising the steps of:

scanning the shadow copy logs from a last system checkpoint to determine transaction status at the time the primary site became unavailable; and beginning forward log recovery from the end of log point in the shadow copy logs.

6. The method recited in claim 5, wherein in-doubt transactions are committed and processed.

7. The method recited in claim 5, wherein in-doubt transactions are rolled back.

8. A method to take-over a primary site with a remote site, the method comprising the steps of:

initializing a remote site having a mirror image of the primary site's database data and logs;

maintaining a shadow copy of the primary site database data at a remote location, comprising:

starting and stopping a tracker system at the remote site, the tracker system performing a recovery cycle to maintain the shadow copy of the primary site's database data at the remote site; and assigning an end log point to a log at the end of each recovery cycle, the end log point marking an end of log scan point for all data recovery done during the current recovery cycle, the end log point used as the log scan starting point for a next recovery cycle;

using the shadow copy logs to place the shadow copy database to a state of the primary site's database before the primary site became unavailable, including;

acquiring locks for data affected by transactions in-doubt at the time of unavailability; and backing-out data updated by transactions not committed at the time of unavailability; and taking-over the primary site with the remote site.

9. The method recited in claim 8, the initializing step further comprising:

establishing a mirror image of the primary site's database data at the remote site by transmitting all primary site database data and recovery logs from the primary site to the remote site; and scanning the recovery logs from the last system checkpoint to determine transaction status and an earliest point in the recovery logs from which recovery required to maintain the shadow copies will be executed.

10. The method recited in claim 9, the steps further comprising transmitting the primary site's log data and an image copy of a database data set to the remote site if either the log data or a database data set is reorganized or replaced after the last tracker system recovery.

11. The method recited in claim 10, wherein in-doubt transactions are committed and processed.

12. The medium recited in claim 11, including a method step wherein in-doubt transactions are committed and processed.

13. The method recited in claim 10, wherein in-doubt transactions are rolled back.

14. The signal bearing medium tangibly embodying a program of machine readable instructions executable by a digital processing apparatus to perform a method for taking-over a primary site with a remote site, the method comprising the steps of:

initializing and rebuilding the remote site, the remote site including a shadow copy of the primary site's database data and logs, the logs reflecting an end log point, the end log point marking an end of log scan point for all data recovery done during prior recovery cycles;

using the shadow copy logs to place the shadow copy database to a state of the primary site's database before the primary site became unavailable;

acquiring locks for database data affected by in-doubt transactions;

backing-out data updated by transactions not committed at a time the primary site became unavailable; and taking-over the primary site with the remote site.

15. The medium recited in claim 14, initializing and rebuilding the remote site further comprising the steps of:

scanning the shadow copy logs from a last system checkpoint to determine transaction status at the time the primary site became unavailable; and beginning forward log recovery from the end of log point in the shadow copy logs.

16. The medium recited in claim 15, including a method step wherein in-doubt transactions are rolled back.

17. The signal bearing medium tangibly embodying a program of machine readable instructions executable by a digital processing apparatus to perform a method for taking-over a primary site with a remote site, the method comprising the steps of:

initializing a remote site having a mirror image of the primary site's database data and logs;

maintaining a shadow copy of the primary site database data at a remote location, comprising:

periodically starting and stopping a tracker system at the remote site, the tracker system performing a recovery cycle to maintain the shadow copy of the primary site's database data at the remote site; and assigning an end log point to a log at the end of each recovery cycle, the end log point marking an end of log scan point for all data recovery done during the current recovery cycle, the end log point used as the log scan starting point for a next recovery cycle;

using the shadow copy logs to place the shadow copy database to a state of the primary site's database before the primary site became unavailable, including;

acquiring locks for data affected by transactions in-doubt at the time of unavailability; and backing-out data updated by transactions not committed at the time of unavailability; and taking-over the primary site with the remote site.

18. The medium recited in claim 17, the initializing step further comprising:

establishing a mirror image of the primary site's database data at the remote site by transmitting all primary site database data and recovery logs from the primary site to the remote site; and scanning the recovery logs from the last system checkpoint to determine transaction status and an earliest point in the recovery logs from which recovery required to maintain the shadow copies will be executed.

19. The medium recited in claim 18, the steps further comprising transmitting the primary site's log data and an image copy of a database data set to the remote site if either the log data or a database data set is reorganized or replaced after the last tracker system recovery.

20. The medium recited in claim 19, further comprising a method step wherein in-doubt transactions are committed and processed.

21. The medium recited in claim 19, further comprising a method step wherein in-doubt transactions are rolled back.

22. A signal-bearing medium tangibly embodying a program of machine-readable instructions executable by a digital processing apparatus to perform a method for maintaining a shadow copy of a primary site's database data at a remote location, said method comprising:

initializing a remote site having a mirror image of the primary site's database data;

periodically starting and stopping a tracker database management system (DBMS) at the remote site, the DBMS performing a recovery cycle to maintain the shadow copy of the primary site's database data at the remote site; and assigning an end log point to a log at the end of each recovery cycle, the end log point marking the end of log scan point for all data recovery done during the current recovery cycle, the end log point used as a starting point for a next recovery cycle.

23. The medium recited in claim 22, the method further comprising:

establishing a mirror image of the primary site's database data at the remote site by transmitting all primary site database data and recovery logs from the primary site to the remote site; and scanning the recovery logs from the last system checkpoint to determine transaction status and an earliest point in the recovery logs from which recovery will be executed.

24. The medium recited in claim 23, the method further comprising transmitting the primary site's log data and an image copy of a database data set to the remote site if either the log data or a database data set is reorganized or replaced at the primary site.

25. An apparatus to maintain a shadow copy of a primary site's database data at a remote location, comprising:

primary site storage including database data and logs;

primary site processor communicatively coupled to the primary site storage, and partially committed to managing the primary site database data and logs;

remote site storage including a shadow copy of the primary site database data and logs;

remote site processor communicatively coupled to the remote site storage, partially committed to managing the remote site database data and logs, the remote site processor communicatively coupled to the primary site and capable of performing method steps to recover the primary site using the remote site by:

initializing a remote site having a mirror image of the primary site's database data;

periodically starting and stopping a tracker database management system (DBMS) at the remote site, the tracker system performing a recovery cycle to maintain the shadow copy of the primary site's database data at the remote site; and assigning an end log point to a log at the end of each recovery cycle, the end log point marking the end of log scan point for all data recovery done during the current recovery cycle, the end log point used as a starting point for a next recovery cycle.

26. The apparatus recited in claim 25, the remote site processor capable of further performing the steps of:

establishing a mirror image of the primary site's database data at the remote site by transmitting all primary site database data and recovery logs from the primary site to the remote site; and scanning the recovery logs from the last system checkpoint to determine transaction status and an earliest point in the recovery logs from which recovery will be executed.

27. The apparatus recited in claim 26, the remote site processor capable of further performing the steps of:

transmitting the primary site's log data and an image copy of a database data set to the remote site if either the log data or a database data set is reorganized or replaced at the primary site.

28. An apparatus to maintain a shadow copy of a primary site's database data at a remote location, comprising:

initializing a remote site having a mirror image of the primary site's database data and logs;

maintaining a shadow copy of the primary site database data at a remote location, comprising:

periodically starting and stopping a tracker system at the remote site, the tracker system performing a recovery cycle to maintain the shadow copy of the primary site's database data at the remote site; and assigning an end log point to a log at the end of each recovery cycle, the end log point marking an end of log scan point for all data recovery done during the current recovery cycle, the end log point used as the log scan starting point for a next recovery cycle;

using the shadow copy logs to place the shadow copy database data to a state of the primary site's database before the primary site became unavailable, including;

acquiring locks for database data affected by transactions in-doubt at the time of unavailability; and backing-out data updated by transactions not committed at the time of unavailability; and taking-over the primary site with the remote site.

29. The apparatus recited in claim 28, the remote site processor capable of further performing the steps of:

establishing a mirror image of the primary site's database data at the remote site by transmitting all primary site database d ta and recovery logs from the primary site to the remote site; and scanning the recovery logs from the last system checkpoint to determine transaction status and an earliest point in the recovery logs from which recovery required to maintain the shadow copies will be executed.

30. The apparatus recited in claim 29, the remote site processor capable of further performing the steps of:

transmitting the primary site's log data and an image copy of a database data set to the remote site if either the log data or a database data set is reorganized or replaced after the last tracker system recovery.

31. The apparatus recited in claim 30, the remote site processor capable of further performing steps wherein in-doubt transactions are committed and processed.

32. The apparatus recited in claim 30, the remote site processor capable of further performing steps of wherein in-doubt transactions are rolled back.

33. An apparatus to maintain a shadow copy of a primary site's database at a remote location, comprising:

means for storing database data and logs at a primary site;

means for storing a shadow copy of the database data and logs at a remote site and communicatively connected to the primary site;

processor means for maintaining and updating the shadow copy communicatively coupled to the primary site and the remote site, and capable of performing method steps to recover the primary site using the remote site by:

initializing a remote site having a mirror image of the primary site's database data and logs;

maintaining a shadow copy of the primary site database at a remote location, comprising:

periodically starting and stopping a tracker system at the remote site, the tracker system performing a recovery cycle to maintain the shadow copy of the primary site's database data at the remote site; and assigning an end log point to a log at the end of each recovery cycle, the end log point marking an end of log scan point for all data recovery done during the current recovery cycle, the end log point used as the log scan starting point for a next recovery cycle;

using the shadow copy logs to place the shadow copy database data to a state of the primary site's database before the primary site became unavailable, including:

acquiring locks for data affected by transactions in-doubt at the time of unavailability; and backing-out data updated by transactions not committed at the time of unavailability; and taking-over the primary site with the remote site.

34. The apparatus recited in claim 33, the initializing step further comprising:

establishing a mirror image of the primary site's database data at the remote site by transmitting all primary site database data and recovery logs from the primary site to the remote site; and scanning the recovery logs from the last system checkpoint to determine transaction status and an earliest point in the recovery logs from which recovery required to maintain the shadow copies will be executed.

35. The apparatus recited in claim 34, the initializing step further comprising transmitting the primary site's log data and an image copy of a database data set to the remote site if either the log data or a database data set is reorganized or replaced after the last tracker system recovery.

* * * * *